No. 834,504. PATENTED OCT. 30, 1906.
A. L. BANKER.
VEHICLE TIRE RIM.
APPLICATION FILED FEB. 5, 1906.
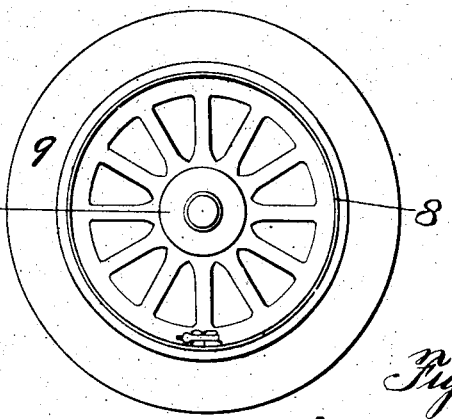
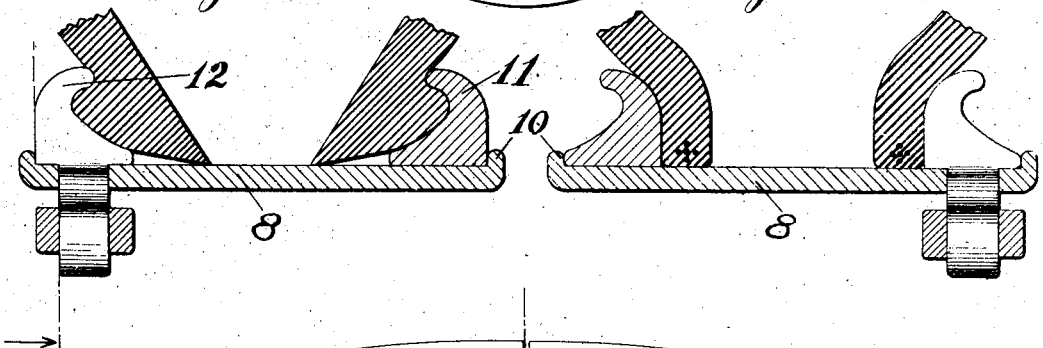
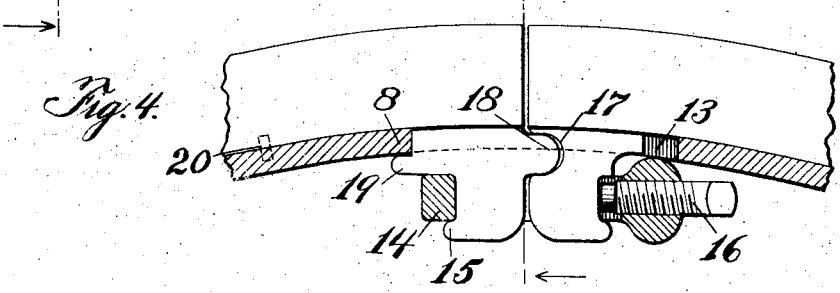
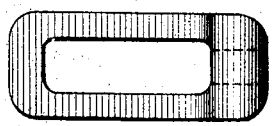
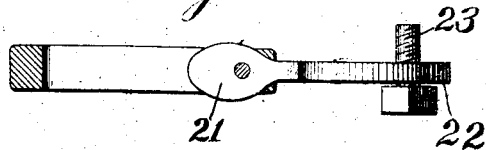
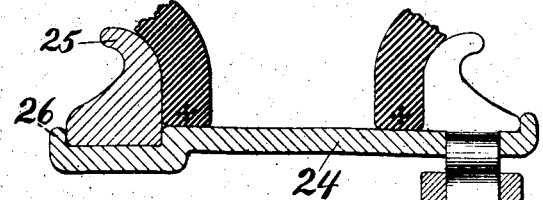
WITNESSES
Harry L. Lechner
J. C. Bradley
INVENTOR
Arthur L. Banker
by atty
Paul Synnestvedt

UNITED STATES PATENT OFFICE.

ARTHUR L. BANKER, OF PITTSBURG, PENNSYLVANIA.

VEHICLE-TIRE RIM.

No. 834,504.      Specification of Letters Patent.      Patented Oct. 30, 1906.

Application filed February 5, 1906. Serial No. 299,452.

*To all whom it may concern:*

Be it known that I, ARTHUR L. BANKER, a citizen of the United States, residing at Pittsburg, in the State of Pennsylvania, have invented certain new and useful Improvements in Vehicle-Tire Rims, of which the following is a specification.

My invention relates to sectional rims for vehicles, and has for its objects; to provide a sectional rim of improved form in which the retaining ring is reversible to accommodate either the beaded clencher tire or the ordinary flangeless tire; to provide an effectual and simple locking means for the ends of the retaining rings, whereby radial movement of such ends is prevented, and to provide a construction in which the retaining rim may be locked positively and securely to the base rim and held from movement in all directions. The preferred form of the device is shown in the accompanying drawings, in which—

Figure 1 is a side view of a wheel provided with applicant's rim and equipped with a tire.

Figure 2 is a transverse section through the rim showing the reversible retaining rings applied to a beaded tire.

Figure 3 is a similar section showing the retaining-rings as applied to the ordinary flangeless tire.

Figure 4 is a longitudinal section through the rim at the point at which the retaining-ring ends are secured, and showing the means whereby the ends are locked together.

Figure 5 is a detail showing the collar for securing the ends of the retaining ring.

Figure 6 is a transverse section through a modified form of retaining collar in which a cam locking means is used instead of the screw of the other form of collar; and Figure 7 is a transverse section showing a modified form of base ring.

The rim is intended for use with vehicle tires in the usual way, and consists of the base rim to which the spokes are attached and two oppositely disposed detachable retaining rings for engaging the edge of the tire. These rings are made reversible so that they may accommodate either the beaded tire or the flangeless tire, and are split so that they may be easily placed about the wheel, and are provided at their meeting ends with locking devices whereby the rings may be securely clamped about the wheel. The locking means is also adjustable whereby if the ring does not fit exactly and the ends do not come exactly together the locking means may accommodate itself to the inaccuracy. The rings are also provided with means for engaging the base rim to prevent circumferential or creeping movement thereon.

As shown in Figure 1, 7 is the wheel body of any preferred type, 8 is the base rim and 9 is the tire. The cross section of the base rim 8 is clearly shown in Figures 2 and 3, and it will be noted that such rim has a flat face and is provided at its side with upstanding beads 10 adapted to engage the sides of the rings 11 and 12. These retaining rings are concave on one side to fit a clencher tire as indicated in Figure 2, and convex on the other side to fit the ordinary flangeless tire as shown in Figure 3. These rings are separable as shown in Figure 4, and the ends thereof are secured together by a locking means, thereby clamping the ring about the base rim. The locking means which is the same for both rings, is adapted to project through the slot 13 in the base rim, and is provided with a collar 14 for holding such ends. The collar 14 is large enough to slip over the lugs 15, and has a screw 16 for clamping the collar in engagement over the interlocking ends. In order to prevent lateral movement of the two ends relative to each other in a direction radial to the wheel, a recess 17 is provided on one end and an interfitting lug 18 on the other end, and in order to hold the one end securely during the application of the ring on the rim, a lug 19 is provided on one of the ends for fitting under the base rim 8. The pins 20 in the retaining rings fitting detachably into recesses in the base rim are provided to prevent circumferential or creeping movement thereof and to hold the retaining ring in place and prevent it from pushing backward and obstructing the slot 13 when the other end of the ring is being applied to the base rim. The slots 13 for the opposing retaining rings are placed at 180° from each other in order that the base rim may not be unduly weakened at any one point, as would of course be the case if the slots for the rings 11 and 12 were adjacent.

In Figure 6 a modified locking means for the collar is shown. This locking means consists of the cam 21 having a handle 22. As shown in Figure 6, the cam is in locking position, in which position the point of the cam is nearest the opposite side of the ring. The cam is held in closed position by the bolt 23 which is screwed into the rim 8. In order to release the collar the bolt 23 is unscrewed and the handle 22 is thrown into a vertical position, whereby the distance between the cam and the opposite side of the collar is decreased, and the collar can slip over the projections 15.

In Figure 7 a modified form of base rim is shown. In this modification the base rim 24 is depressed at one edge to receive the retaining ring 25 and the retaining ring is widened so that its top is at the same height as the other retaining ring. The object attained in this construction is the lowering of the bead 26 so that the tire can be easily slipped on and off on that side.

The operation in removing the ring is as follows: The screw 16 is loosened sufficiently to allow the collar 14 to slip over the head 15; the right hand end of the ring as shown in Figure 4 is then sprung to the right so that it can slip out through the slot 13, and the entire ring is then expanded to free the circumferential holding pins 20, after which the left hand end of the ring as shown in Figure 4 may be slipped to the right, thereby freeing the lug 19 from the rim. The operation of replacing the rim will be the reverse of that just described, and a description thereof is unnecessary.

The advantage of my construction will be apparent to those skilled in the art. It is obvious that the rim may be very easily and conveniently displaced and put back again, and that the rim when in place is braced and secured in every possible direction, the bead 10 preventing sidewise movement of the rim, the lug 18 preventing relative movement of the ends of the ring in a direction radial to the wheel, the lug 19 preventing a relative movement of the base rim and the retaining ring in a direction radial to the wheel, and the pins 20 preventing circumferential or creeping movement of the ring and holding the lug 19 in place. It will also be noted that by making the base rim flat a superior bearing surface for the flat faced retaining ring is provided. Another important advantage resides in the adjustability of the collar and screw holding means as such adjustability provides a means for compensating for any inaccuracy of fit of the retaining rings over the base rim. In other words the retaining ring if not exactly the right length may within certain limits be made to fit by adjusting the screw 16, thereby bringing the ring ends closer or further apart as desired. This feature has considerable bearing on the cost of production as it obviates the necessity of great accuracy of construction which heretofore has been imperative in this class of detachable rims.

It will be apparent that various modifications might be made from the preferred form of structure shown, without departing from the invention, as for instance, the provision of a different style of locking means in place of the parts 17 and 18, the use of some other engaging means for the under side of the rim other than a projecting lug 19, or the use of some other securing means than the collar 14, as for instance a bolt or turnbuckle extending through the two ends. All of these modifications are within the scope of my invention, and are covered by the claims.

Having thus described my invention and illustrated its use, what I claim as new, and desire to secure by Letters Patent, is the following:

1. In combination, a beaded flat base rim, a pair of reversible separable retaining rings having flat seats on the base rim and adapted to engage on opposite sides when in one position a beaded tire and when in another position a flangeless tire, means to fasten the ends of the rings, and other interlocking means adapted to prevent movement of the ends relative to each other in a direction radial to the wheel.

2. In combination, a beaded flat base rim, a pair of reversible separable concave convex retaining rings having flat seats on the base rim and adapted to engage on opposite sides when in one position a beaded tire and when in another position a flangeless tire, adjustable means to fasten the ends of the rings, and other interlocking means adapted to prevent the movement of the ends relative to each other in a direction radial to the wheel.

3. In combination, a base rim provided with a slot, a separable retaining ring adapted to fit thereon and having ends projecting through the slot and provided with interlocking means adapted to prevent movement of the ends relative to each other in a direction radial of the wheel, and means for securing the ends together.

4. In combination, a base rim provided with slots, a pair of separable retaining rings adapted to fit thereon and having ends projecting through the slots and provided with interlocking means adapted to prevent movement of the ends relative to each other in a direction radial of the wheel, and collars for securing the ends together.

5. In combination, a base rim provided with slots, a pair of separable retaining rings adapted to fit thereon and having ends projecting through the slots and provided with interlocking means adapted to prevent movement of the ends relative to each other in a direction radial of the wheel, and collars provided with locking means for securing the ends together.

6. In combination, a base rim provided with a slot, a separable retaining ring adapted to fit thereon and having ends projecting through the slot and provided with interlocking means adapted to prevent movement of the ends relative to each other in a direction radial of the wheel, and a collar provided with a locking screw for securing the ends together.

7. In combination, a base rim provided with a slot, a separable retaining ring adapted to fit thereon and having ends projecting through the slot and provided with interlocking means adapted to prevent movement of the ends relative to each other in a direction radial of the wheel, means for preventing circumferential movement of the ring, means on one of the ring ends for engaging the inner side of the rim adjacent the slot to prevent movement of such end radial to the wheel, and means for securing the ring ends together.

In testimony whereof I have hereunto signed my name in the presence of the two subscribed witnesses.

ARTHUR L. BANKER.

Witnesses:
J. C. BRADLEY,
F. E. GAITHER.